United States Patent [19]

Negishi et al.

[11] 4,004,851
[45] Jan. 25, 1977

[54] OPTICAL DEVICE WITH MEANS FOR REDUCING INTERNAL REFLECTIONS

[76] Inventors: Hirokazu Negishi, No. 1-23, Honmoku-cho, Naka-Ku, Yokohama Kanagawa; Kazuya Matsumoto, No. 1-88, Tamagawa Okusawa Setagaya, Tokyo, both of Japan

[22] Filed: Oct. 10, 1972

[21] Appl. No.: 296,304

Related U.S. Application Data

[63] Continuation of Ser. No. 78,179, Oct. 5, 1970, abandoned, which is a continuation of Ser. No. 837,964, March 19, 1969, abandoned, which is a continuation-in-part of Ser. No. 573,097, Aug. 17, 1966, abandoned.

[30] Foreign Application Priority Data

Aug. 24, 1965 Japan .................... 41-4051582
Aug. 24, 1965 Japan .................... 41-4051583

[52] U.S. Cl. .................... 350/311; 427/164; 350/165; 350/276 R
[51] Int. Cl. .................... G02b 5/22; B32b 17/06
[58] Field of Search .................... 106/20–25, 106/208, 209, 289, 307; 117/124 A, 124 E, 33.3, 124 D, 168; 350/164, 311, 276, 165; 351/174

[56] References Cited

UNITED STATES PATENTS

| | | | |
|---|---|---|---|
| 1,631,421 | 6/1927 | Lohofer | 96/84 R |
| 3,039,349 | 6/1962 | Rodgers | 117/33.3 |
| 3,062,103 | 11/1962 | Bolz | 350/311 |
| 3,298,959 | 1/1967 | Marks | 350/1 |
| 3,509,063 | 4/1970 | Teague | 106/307 |

FOREIGN PATENTS OR APPLICATIONS 663,725 5/1963 Canada .................... 350/1

OTHER PUBLICATIONS

Harrick, "Total Internal Reflection and its Application to Surface Studies," in Annals of N.Y., Acad. Sci., 101, pp. 928–959, 1963.
Sease, "Halation" in American Cinematographer, p. 14, July, 1931.

*Primary Examiner*—Ralph Husack
*Assistant Examiner*—William H. Schmidt
*Attorney, Agent, or Firm*—Toren & McGeady

[57] ABSTRACT

The outer surface of a transparent optical mass is directly coated with an internal reflection suppressing coating having an index of refraction smaller than that of the optical mass for suppressing internal reflections of light passing through the mass at angles of incidence to the surface greater than the critical angle. The coating includes a dispersing medium and a material in the form of light absorbing particles having dimensions smaller than one-fifth of the wavelength of visible light dispersed in the medium. The particles have a sufficient density near the surface to absorb a major portion of visible light at all wavelengths incident upon the surface through the mass at angles of incidence greater than the critical angle.

3 Claims, 13 Drawing Figures

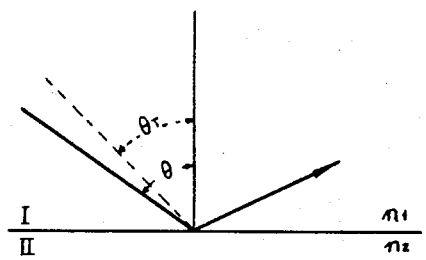
FIG. 1A
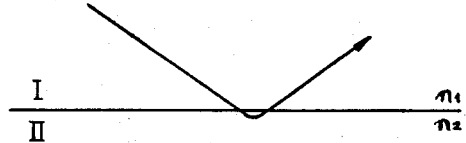
FIG. 1B
FIG. 2
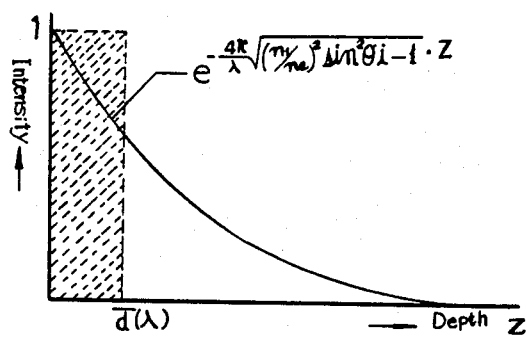
FIG. 3 (A)
FIG. 3 (B)
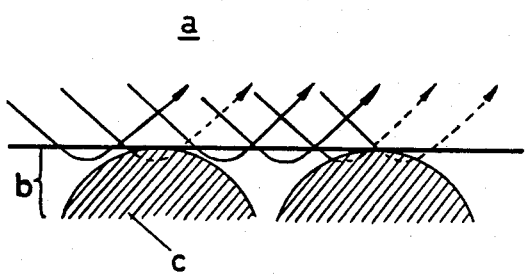
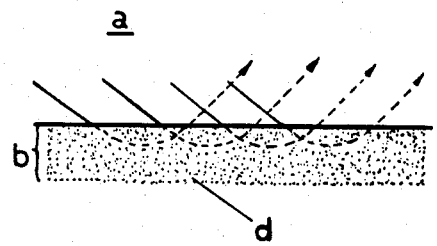

OPTICAL DEVICE WITH MEANS FOR REDUCING INTERNAL REFLECTIONS

REFERENCE TO RELATED APPLICATIONS

This is a continuation of application Ser. No. 78,179, filed Oct. 5, 1970, now abandoned, which in turn was a continuation of Ser. No. 837,964 filed Mar. 19, 1969, now abandoned, Ser. No. 837,964 having been a continuation-in-part of Ser. No. 573,079 filed Aug. 17, 1966, now abandoned.

BACKGROUND OF THE INVENTION

This invention relates to optical devices and particularly to optical devices which suppress internal reflections of light passing through a transparent optical mass towards its outer surface at angles of incidence to the surface greater than the critical angle.

In the art of non-reflecting coatings for optical glass, carbon black is usually employed as a light-absorbing material. However, such a coating exhibits disadvantages as the refractive index of the optical glass is increased to a higher value. The amount of light totally reflected at the interface between an optical glass and a coating is increased due to the difference between the refractive index of the glass and that of the coating, so that the light reflected at the internal interface increases.

In order to overcome this defect, it is conventional to employ a coating composition having a refractive index which has a particular correlation with respect to the refractive index of the optical glass. There are, however, limits to the selection of a coating composition having a higher refractive index. Thus, a coating composition having an $nd$ value higher than approximately 1.62 cannot be used. By $nd$ value is meant an optical light pass length.

In addition, light of a longer wave length is absorbed to a greater extent than is light of a shorter wave length, because the longer wave length light must pass through a greater distance in the coating layer than does the shorter wave length light. For this reason, there arises the difficulty that light reflected at the internal interface becomes colored due to light in the range of relatively shorter wave lengths, when a coating having a constant coefficient of absorption with respect to light of various wave lengths, such as a black-colored coating, is used.

SUMMARY OF THE INVENTION

As a result of an investigation of the phenomenon of total reflection, it has been determined that the problems mentioned above in the prior art can be overcome by taking into consideration the phenomenon of wave suppression effected by total reflection light, a consideration which hitherto has been overlooked. Thus, in accordance with the invention, reflection of light at the internal interface in a coated optical glass having a high refractive index, as well as at the internal interface of a coated ordinary optical glass, advantageously is prevented by absorbing effectively the total reflection light and which causes the phenomenon of wave suppression.

According to a feature of the invention, an internal reflection suppressing coating on an optical mass includes a dispersing medium and a material in the form of light absorbing particles having dimensions smaller than one-fifth of the wavelength of visible light dispersed in the medium and having a sufficient density near the surface to absorb a major portion of visible light at all wavelengths incident upon the surface through the mass at angles of incidence greater than the critical angle.

A feature of the invention resides in the use of a light absorbing material dispersed, in the form of particles smaller than one-fifth of the wave length of visible light, such as a dyestuff, lake and the like, for effectively absorbing light resulting from the phenomenon of wave suppression displayed by total reflection light. Thus, the invention relates to a coated for leveling the spectral characteristic of internal reflection light, this coating comprising a composition containing a material absorbing light of shorter wave length to a greater extent than it absorbs light of a longer wave length. Stated another way, the coating composition selectively transmits the longer wave length light as compared to the shorter wave length light.

An object of the invention is to provide coating compositions for eliminating internal interface reflection in a coated lens, prism or the like constructed of optical glass.

Another object of the invention is to provide coating compositions for eliminating internal interface reflection in coated transparent bodies, such as lenses, prisms and the like, formed of glass having a high refractive index.

A further object of the invention is to provide coating compositions by means of which substantially black total reflection results.

Another object of the invention is to provide coating compositions in which no chromatic aberration, due to light reflection at the internal interface, occurs.

For an understanding of the principles of the invention, reference is made to the following description of particular embodiments thereof, as illustrated in the accompanying drawings.

BRIEF DESCRIPTION OF THE DRAWINGS

In the drawings:

FIGS. 1A and B are diagrams respectively graphically illustrating the phenomenon of total reflection, by means of geometrical and physical optics;

FIG. 2 is a diagram graphically illustrating the variation in light intensity resulting from the phenomenon of wave suppression;

FIG. 3A is a diagram graphically illustrating the phenomenon of light reflection in the case of a conventional coating;

FIG. 3B is a diagram graphically illustrating the phenomenon of light reflection in the case of a coating composition in accordance with the invention;

DETAILED DESCRIPTION OF THE PREFERRED EMBODIMENTS

Figure 4A:
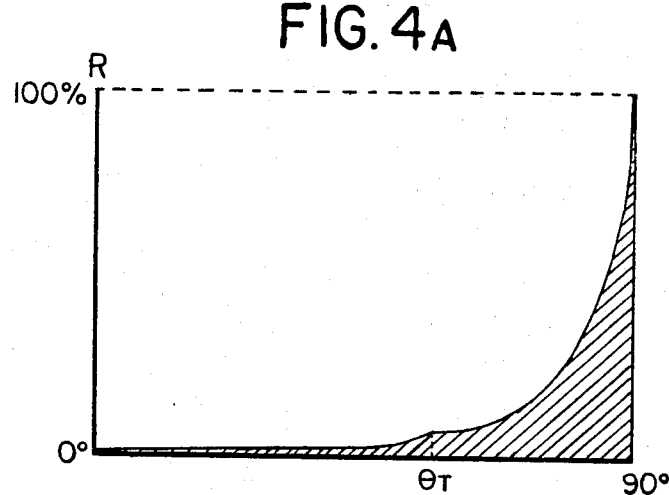
FIGS. 4A and 4B are diagrams graphically illustrating the relations between the angles of incidence and reflection, with the hatched portion representing actual reflection, in the case of a coating composition embodying the invention and a conventional coating composition, respectively.
Figure 4:
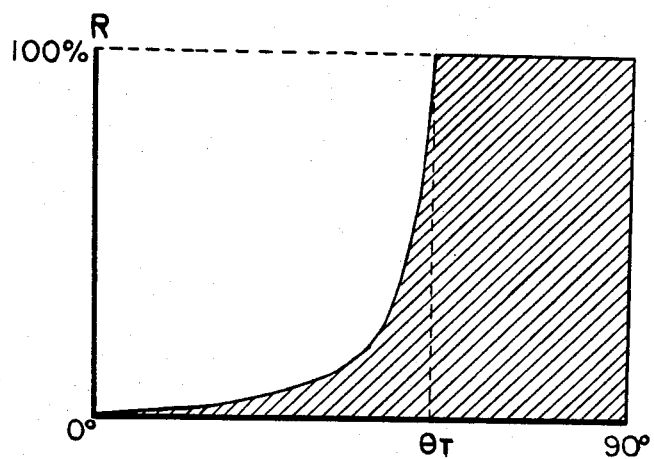

Although coating compositions used in the prior art absorbed a light traveling therein after being refracted, they could not absorb light returning to an optical glass after having been totally reflected at the interface between the glass and the coating. A coating composition in accordance with the invention, however, is able to absorb effectively light which is of such a nature that it is totally reflected, as well as light travelling in a coating after being refracted. The reason why the coating compositions of the invention exhibit such superior properties will be apparent as the description proceeds.

Upon an examination in detail of the phenomenon of total reflection, it is found that light which is of such a nature that it is totally reflected is always suppressed at least once in a secondary medium, and then returns into a primary medium to be converted into total reflection light.

FIGS. 1A and 1B explain the phenomenon of total reflection by means of geometric optics and physical optics, respectively, and in that order, and it will be observed that there are somewhat different interpretations applicable to FIG. 1A and to FIG. 1B. In geometric optics, light travelling at an angle of incidence larger than $\theta_T$ (critical angle), may be completely reflected at the interface, as shown in FIG. 1A, wherein $\sin \theta_T = n_2/n_1$ ($n_1$ is greater than $n_2$).

In physical optics as illustrated in FIG. 1B, on the contrary, light travelling at an angle of incidence even larger than $\theta_T$ may return to a primary medium after having travelled by a distance of approximately one-fifth of the wave length of the light in a secondary medium. The intensity of such light, resulting from the phenomenon of wave suppression, is expressed by the following term, with relation to FIG. 2: $e$ Exponent $[(-4Z \pi/\lambda) \sqrt{(n_1/n_2)^2 \sin^2\theta i - 1}]$ In this expression, $i$, $Z$ and $\lambda$ represent, respectively, the angle of incidence of light onto the interface of a coating layer, the depth from the interface of the coating layer, and the wave length of the light.

Decrements in intensity, at the depth Z from the interface at which the phenomenon of wave suppression occurs, wherein $n_1$, $n_2$ and $\theta_i$ are 1.75°–1.8°, 1.50° and 68°, respectively, are as follows, picking the intensity at $Z = 0$ (at the interface) as being 1:

| | | | |
|---|---|---|---|
| Z = | 0.1 | intensity | 0.5 |
| do. | 0.2 | do. | 0.3 |
| Z = | 0.5 | do. | 0.02 |

From the foregoing description, it can be concluded that the average depth at which the phenomenon of wave suppression occurs is approximately one-fifth of the wave length of light, such as one-fifth of the wave length of visible light. If the light resulting from the phenmenon of wave suppression is absorbed, the amount of light of such a nature that it is totally reflected is reduced. In a conventional coating comprising carbon black (a plurality of particles being coagulated), the particle size is too large to locate a large amount of particles at the interface between the optical glass and the coating, at which, and in the vicinity of which, light resulting from the phenomenon of wave suppression may be present. Thereby, the light resulting from the phenomenon of wave suppression cannot be absorbed effectively, as illustrated graphically in FIG. 3A.

In FIGS. 3A and 3B, $a$, $b$ and $c$ represent, respectively, a glass, a coating and carbon black particles in the coating. As illustrated in FIG. 3B, an optical glass $a$ has applied thereto a light absorbing composition in accordance with the invention, comprising dyestuff or lake $d$ having a particle size smaller than one-fifth of the wave length of visible light. Using this light absorbing composition, the light is absorbed effectively in the composition present in a large amount at the interface between the optical glass $a$ and the coating $b$, and in the vicinity thereof. The relation between the angles of incidence and reflection in this case is shown in FIg. 4A, which ilustrates an example wherein the coating composition embodying the invention is used, and FIG. 4B, which illustrates an example wherein a conventional coating composition is used for comparison. In these two figures, the hatched area represents the actual reflection.

Figure 5:
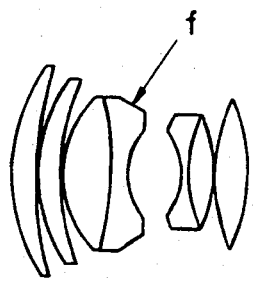
FIG. 5 is a schematic side elevation view of a lens system utilizing a coating composition in accordance with the invention.
Figure 6:
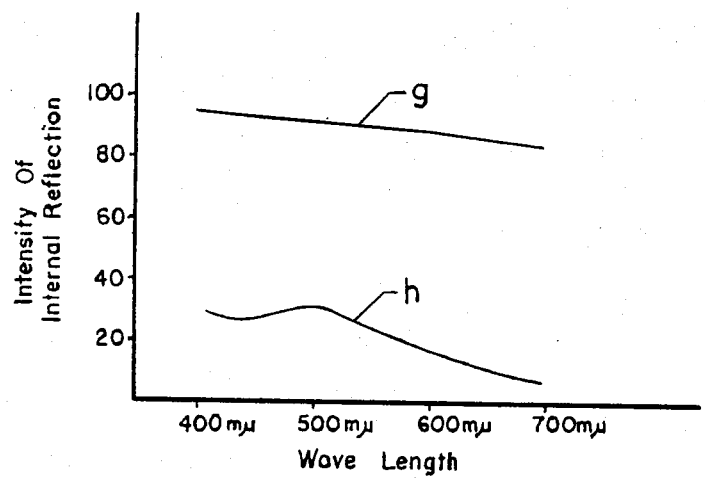
FIG. 6 is a diagram graphically illustrating the relation between the intensity of internal reflection and the wave length of light, and comparing the effect attained by the optical system of FIG. 5 with that of an optical system using a conventional coating.

If the carbon black is maintained free from coagulation, by any technique, or,, in other words, if it completely uniformly dispersed and the particle size maintained below one-fifth of the wave length of visible light, it can be employed preferably in the preparation of a coating composition embodying the invention. In the case where a conventional coating for preventing internal reflection is applied to sand-abraded sloping face $f$ of a lens assembly including a number of convex lenses, as shown in FIG. 5, internal reflected light can hardly be absorbed, as will be noted from the curves $g$ of FIg. 6. On the other hand, if a coating composition embodying the invention is applied to the face $f$, the light reflected at the interface is almost completely absorbed, as can be seen from the curve h of FIG. 6, and blacking is effectively achieved.

The vehicles and solvents to be used should be so selected that dyestuff or lake is dispersed in the form of particle sizes smaller than one-fifth of the wave length of visible light, or in the form of particles having a size of less than 0.16 $\mu$. In the case of a vehicle of an organic solvent-soluble type, for example acrylic resins, vinyl resins, melamine-denatured resins, natural resins, cumarone resins, indene resins and bituminous substances, oil-soluble or alcohol-soluble dyestuff and lake preferably are used. In the case of a water-soluble vehicle, for example, gelatin, polyvinyl alcohol, glue, gum arabic, and the like, water-soluble dyestuff and lake are preferably used for attained the objective of the invention.

For absorbing as effectively as possible light resulting from the phenomenon of wave suppression, either the concentration of the light absorbing substance may be increaesd or the absorptive power thereof may be increased. Both alternatives, however, have inherent limitations.

The use of a bituminous substance, such as, for example, pitch asphalt and gilsonite as a vehicle, is very effective for lowering or decreasing the internal reflectivity. Since the bituminous substance functions as a light absorbing material having a particle dimension less than one-fifth of the wave length of visible light, as well as functioning as a vehicle, it exhibits a high absorptive power which is not attainable by any other transparent vehicle. It is most favorable as a coating material for preventing internal reflection, due to the high absorptive power coupled with a decreased fading characteristic with respect to light.

The following are examples of the invention.

Example 1

| | by weight |
|---|---|
| Oil color black HBB (C.I. 26150) (oil-soluble dyestuff) (Mitsubishi Chem. Industries Co., Ltd.) | 2 parts |
| pitch for abrasion | 5 parts |
| Bisphenol A-type epoxy resin (average molecular weight 370) | 2 parts |
| Carbon black | 2 parts |

The composition aforesaid is dissolved in 30 parts of toluol, and the admixture is treated with a ball mill for 48 hours for mixing homogeneously. The anti-reflection effect at the internal interface exhibited by the coating composition is shown in curve h of FIG. 6.

Example 2

| | (by weight %) |
|---|---|
| Oil color black HBB (C.I. No. 26150) | 2 parts |
| Yellow No. 6. (C.I. No. 11670) (lake) | 1 parts |
| Carbon Black | 2 parts |
| Rosin (Colophonium) | 5 parts |
| Methylethylketone | 100 parts |

Example 3

| | |
|---|---|
| Black oil-soluble dye (C.I. 50420) | 2 parts |
| Carbon black | 2 parts |
| Rosin (colophonium) | 5 parts |
| Methylethylketone | 100 parts |

Example 4

| | (by weight %) |
|---|---|
| Black oil-soluble dye (C.I. No. 50420) | 2 parts |
| Orange No. 1 (C.I. No. 11725) (lake) | 1 part |
| Carbon Black | 2 parts |
| Rosin (colophonium) | 5 parts |
| Methylethylketone | 100 parts |

Example 5

| | |
|---|---|
| C.I. 26150 | 2 parts |
| Carbon black | 2 parts |
| Rosin (colophonium) | 5 parts |
| Methylethylketone | 100 parts |

Example 6

| | |
|---|---|
| C.I. 26150 | 2 parts |
| Polymethacrylic acid | 1 part |
| DOP (dioctylphtalate) | 1 part |
| M.I.B.K. (Methyl Isobutyl Ketone) | 100 parts |
| n. Butyl Acetate | 20 parts |
| Carbon black | 10 parts |

In the curve of light intensity resulting from the phenomenon of wave suppression, as shown in FIG. 2, the area of the hatched portion is:

$$\int S_o \exp. (-4\pi/\lambda \, ((n_1/n_2)^2 \sin^2 \theta - 1)^{1/2} Z) \, dz = 1 \times d(\lambda)$$

In this equation, $n_1$ is the index of refraction of the primary medium, $n_2$ is the index of refraction of the secondary medium and Z is the depth from the interface to the secondary medium. The average depth of $\bar{d}(\lambda)$ of light leaked is calculated, from the equation mentioned above, as: $\bar{d}(\lambda) = k\lambda$, wherein $k$ is a constant depending on the refractive indexes of the primary and secondary media and the angle of incidence $\theta$ and $\lambda$ is the wave length of incident visible light. From this equation, it will be understood that light having a longer wave length is absorbed to a greater extent as compared to the absorption of light having a shorter wave length, since light having a longer wave length must pass a greater distance through the coating layer than does the shorter wave length light.

Figure 7:
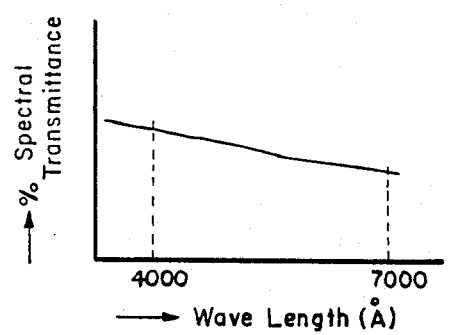
FIGS. 7 through 10 are diagrams graphically illustrating the relation between spectral transmittance and wave lengths with different embodiments of coating compositions in accordance with the invention.
Figure 8:
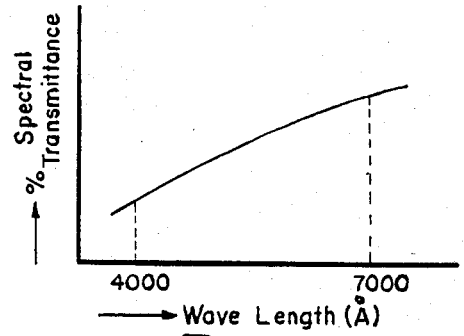

If a coating material having a constant coefficient of light absorption with respect to the wave length, such as a black-colored coating, is used, the internally reflected lght becomes colored by the light of shorter wave length, as indicated in FIg. 7. In accordance with the invention, this problem has been solved by the provision of a coating composition into which there is incorporated a coating material which is able to absorb preferentially light of a shorter wave length to a greater extent as compared to light of longer wave length. In other words, it transmits a greater amount of light of longer wave length than light of shorter wave length. This material is incorporated as a coating material for leveling the spectral characteristic of the internally reflected light, which means that the internally reflected light is made to the black-colorerd, as can be seen from FIG. 8.

Favorable results have been attained when the spectral transmittance toward the side of a longer wave length (6,500 A) was increased by 10 – 40 percent when compared with that toward the side of the shorter wave length (4,500 A) in accordance with experiments. Since the light is colored if the spectral transmittance is unevenly increased during the course, however, it is desirable not to form a convex portion on a spectral transmittance curve, especially in the range of green light, to which luminosity is very sensitive.

Example 7

As a general rule, in preparing a coating composition, a black-colored dyestuff or lake, as a base, has added thereto a large amount of a yellow-dyestuff or lake able to transmit preferentially light toward the side of longer wave length, and with orange-through-scarlet colored material as a color conditioning agent (for the purpose of preventing coloring by intermediate colors). For example, 2 parts of a black-colored, oil-soluble dyestuff, for example, oil-colored black HBB, two parts of a scarlet system, oil-soluble dyestuff, for example, oil-colored-scalet No. 308 and 5 parts of yellow-colored, oil-soluble dyestuff, for example, oil-color yellow No. 105 are dissolved in 100 parts of toluol have 18 parts of pitch, 3 parts of an epoxy resin and 6 parts of carbon black added thereto. The resulting mixture is blended for 48 hours by means of a ball mill to prepared a uniform dispersion. The pitch also functions as a light absorbing material, as well as functioning as a vehicle. The coating composition is most favorable for reducing the phenomenon of internal reflection of light, owing to its high absorptive power, which is a characterstic not exhibited by any other transparent vehicles, coupled with its lowing fading characteristics when exposed to light.

Figure 9:
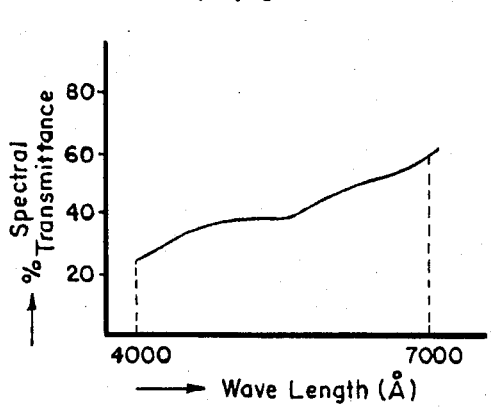
Figure 10:
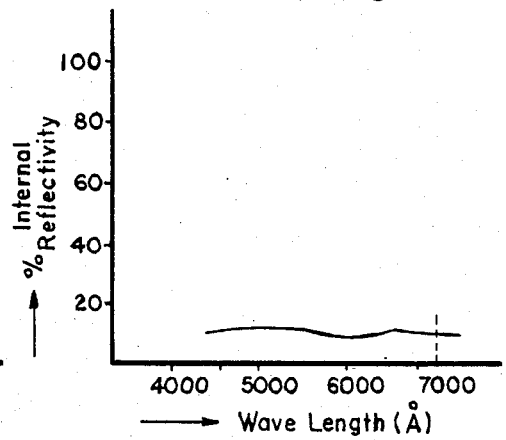

The spectral transmittance and the spectral characteristic of internal reflection exhibited by an optical lens, to which there is applied the coating composition prepared as just-described, are shown in FIGS. 9 and 10. It will be clear from these figures that the internal reflected light is rendered suffuciently black.

A number of coating compositions can be prepared using a dyestuff other than the dyestuff illustrated, or by using a water-soluble dyestuff or a water-soluble vehicle. The following are examples utilizing, respectively, a water-soluble dyestuff and a water-soluble vehicle.

Example 8

| | |
|---|---|
| Sumilight Supre Brawn T conc. (Sumitomo Chemical Industry Co., Ltd) | 4 parts |
| Lanyl Black BG extra conc. (Sumintomo Chemical Industry Co., Ltd) | 1 part |
| Polyvinyl alcohol | 2 parts |
| Distilled water | 200 parts |

Example 9

| | |
|---|---|
| Sumitomo Fast Brown R (Sumitomo Chemical Industry Co., Ltd) | 4 parts |
| Lanyl Black BG extra conc. | 1 part |
| Gum arabic | 2 parts |
| Distilled water | 200 parts |

What is claimed is:

1. An optical device comprising a transparent optical mass having an outer surface, internal reflection suppressing coating having an index of refraction smaller than that of said optical mass and coated directly on said surface for suppressing internal reflections of light passing through said mass at angles of incidence to said surface greater than the critical angle, said internal reflection suppressing coating including a dispersing medium and a material in the form of light absorbing particles having dimensions smaller than one-fifth of the wavelength of visible light dispersed in said medium and having a sufficient density near the surface to absorb a major portion of visible light at all wavelengths incident upon the surface through the mass at angles of incidence greater than the critical angle.

2. A device as in claim 1, wherein said mass has a volume and a uniform degree of transparency throughout said volume, said mass having substantially the same degree of transparency at the outer surface as throughout the major portion of its volume.

3. A device as in claim 2, wherein said internal reflection suppressing means include a second material in the form of light absorbing particles having dimensions less than one-fifth of the wavelength of light and having a color to preferentially absorb wavelengths of light so as substantially to equalize the absorption of all wavelengths of light.

* * * * *